June 14, 1938.          J. H. GRAFF          2,120,404
SAMPLE HOLDER
Filed May 17, 1937          2 Sheets-Sheet 1

Inventor
John H. Graff
By: Fisker, Clapp, Adams & Pond
Attys.

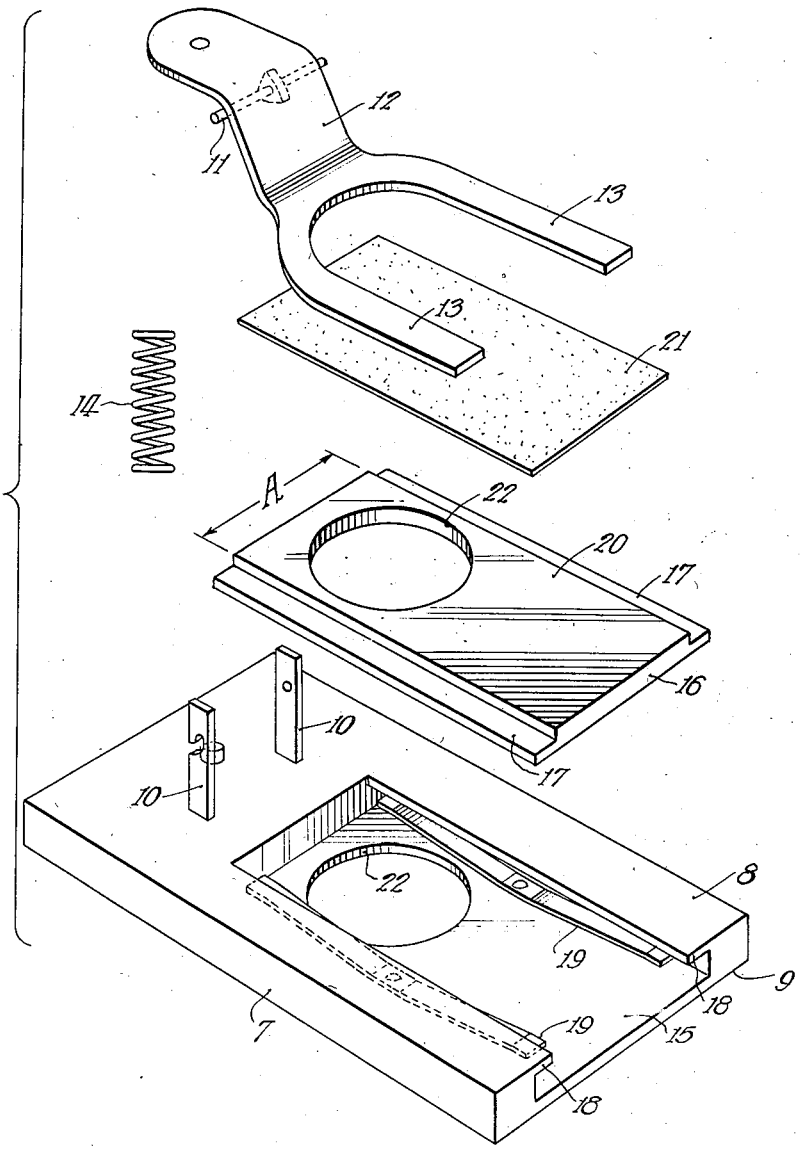

Patented June 14, 1938

2,120,404

UNITED STATES PATENT OFFICE 2,120,404

SAMPLE HOLDER

John H. Graff, Appleton, Wis., assignor to The Institute of Paper Chemistry, Appleton, Wis., a corporation of Wisconsin Application May 17, 1937, Serial No. 142,995

2 Claims. (Cl. 88—40)

My invention relates generally to sample holders for use in conjunction with microscopes or the like and has particular reference to devices of this type for holding samples of materials such as paper, cloth, intaglio printing plates, etc. having a surface texture which may or may not have a directional characteristic.

Comparative examinations of these materials, particularly papers, are often made as a routine manufacturing test and are usually carried out with the aid of a microscope. In many instances special illuminating apparatus capable of producing a directional beam of light at varying angles of incidence is used in connection with the microscope, and in order that examinations shall be readily comparative, it is highly desirable that the sample holder shall be capable of automatically locating the surface of each successive sample at exactly the same point with reference to the optical system of the microscope and the illuminating apparatus regardless of ordinary variation in the thickness of the sample. The sample holders heretofore available to the art are incapable of operating in this manner, and the principal object of the present invention is to provide a sample holder which shall automatically locate the surface of samples held thereby at the same level regardless of the thickness of such samples.

Other objects of my invention are to provide an improved sample holder in accordance with the above stated object which shall be convenient and easy to use; to provide an improved sample holder which shall not only locate the surface of samples of differing thickness at the same level, but which shall also hold even very thin samples perfectly flat during the examination thereof; and generally, to provide an improved sample holder particularly adapted for use in conjunction with microscopes employing beam type illuminators. Further objects and advantages of the invention will be made more apparent by reference to the following description of one preferred embodiment thereof, and by reference to the accompanying drawings wherein—

Figure 4 is an exploded perspective view of the several structural elements making up the sample holder illustrated in the other figures of the drawings.

Figure 1:
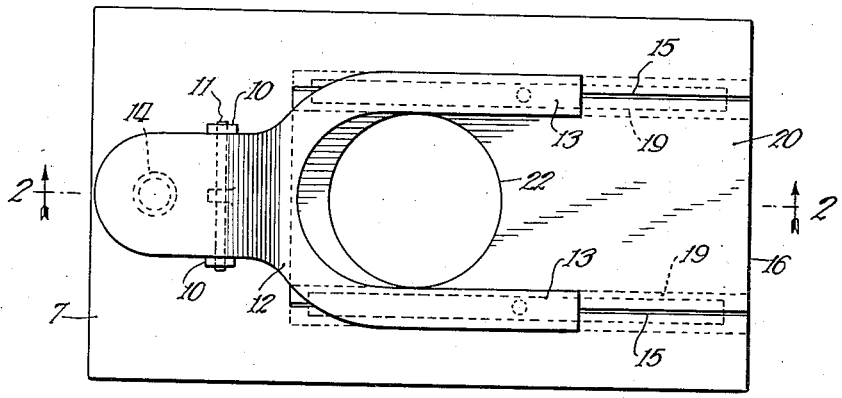
Figure 1 is a plan view of a sample holder embodying the features of the present invention.
Figure 2:
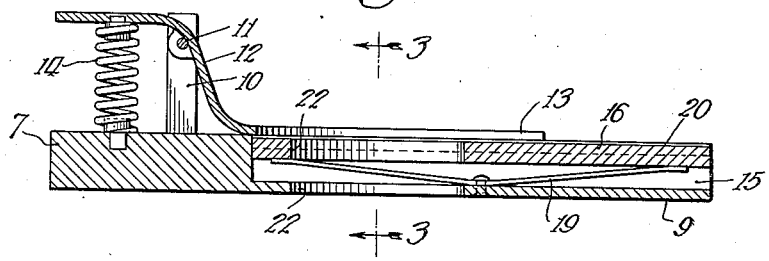
Figure 2 is a sectional view on the general line 2—2 of Figure 1.

The sample holder illustrated in the drawings includes a base or bed plate 7 which is adapted to be mounted upon the platform of the microscope or other apparatus with which the device is used. The upper and lower surfaces 8 and 9 of the bed plate 7 are preferably machined flat and parallel to each other. A pair of uprights 10 adapted to receive a pivot pin 11 upon which is supported a forked clip 12 for holding the sample are rigidly supported upon the bed plate 7. The bifurcated end sections 13 of the clip 12 are biased in the direction of the upper surface 8 of the bed plate 7 by a suitable spring 14 which is of sufficient strength to locate the upper surface of the sample coincident with the upper surface 8 of the bed plate as will hereinafter appear.

A generally rectangularly shaped slot 15 is formed in the central portion of the bed plate for receiving a rest plate 16 upon which the sample is adapted to lie. The sides of the rest plate 16 terminate in tongue portions 17 which are adapted to fit beneath overhanging portions 18 of the bed plate proper, and the rest plate is biased upwardly by a pair of flat springs 19 affixed to the bottom of the bed plate or by other suitable means.

The upper surface 20 of the rest plate 16 is machined flat, and the rest plate engages the slot 15 in the bed plate 7 somewhat loosely. It will thus be evident that in the assembled holder the rest plate 16 may be depressed relative to the upper surface 8 of the bed plate. The width and location of the bifurcated sections 13 of the forked clip are such that each section overlies the adjacent portions of the rest plate and the bed plate.

Figure 3:
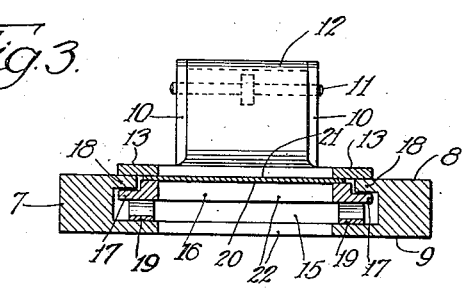
Figure 3 is a sectional view on the general line 3—3 of Figure 2.

During use of the device, it is contemplated that the sample (indicated at 21 in Figures 3 and 4) shall be positioned upon the rest plate 16 and held in place by the side sections 13 of the forked clip, as shown in Figure 3. Hence, the sample used in conjunction with the holder should have a width substantially equal to the width of the central portion of the rest plate, i. e. have a dimension equal to or slightly less than that indicated at A on Figure 4. When a sample of this width is in place in the sample holder, the upper surface thereof will be biased into engagement with the lower surface of the side portions 13 of the forked clip 12 by the flat springs 19.

It will be immediately apparent that this arrangement assures that the upper surface of the sample will always be located in the same plane relative to the bed plate 7 of the sample holder, regardless of its thickness. In the device illustrated, the plane of the surface of the sample will coincide with the upper surface 8 of the bed plate, although other arrangements are obviously possible. By virtue of this characteristic of the device, comparative examinations may be very readily carried out for a large number of samples which may be of differing thickness without necessitating adjustment of the optical constants of the apparatus. This becomes of particular importance when using a variable angle illuminator such as is disclosed in my copending application, Serial No. 117,553 which was filed on December 24, 1936 and which is assigned to the assignee of the present invention, satisfactory operation of a variable angle illuminator of this type requiring that the surface level of successive samples shall be maintained constant with respect to the axis of the illuminating beam and the optical axis of the microscope or other instrument.

The resilient suspension of the rest plate 16 assures that the sample shall be maintained perfectly flat at all times. It is desirable that the rest plate 16 and the bed plate 7 shall be provided with cooperating, aligning openings 22 in order to permit observation of the sample by transmitted light.

The pivoted support for the forked clip 12 is of great value in facilitating the placing of the sample upon the rest plate and adds much to the ease and reliability of operation of the device. It will be apparent, however, that the principal function of the side or sample engaging portions 13 of the forked clip is to locate the upper surface of the sample, and means other than the clip illustrated might be employed for this purpose.

Various modifications may be made in sample holders embodying the principles which I have disclosed in the foregoing. It is my intention, therefore, that the accompanying claims shall be accorded the broadest reasonable construction consistent with the state of the art.

I claim the following as my invention:

1. In a sample holder for microscopes, a bed plate, the central portion of which is cut away to define a relatively wide slot, a rest plate having a generally flat upper surface said rest plate being positioned within said slot and being movable in a direction generally perpendicular to the base plane of said bed plate, a spring for biasing said rest plate upwardly relative to said bed plate, a fork-shaped sample engaging member pivotally supported on said bed plate and comprising a pair of spaced parallel side portions, a spring for biasing said member towards the bed plate, each side portion, when in contact with the bed plate, being positioned to overlie contiguous portions of the bed plate and rest plate, said last-named spring being stronger than said first-named spring whereby said side portions may contact a sample in position on the rest plate and maintain the sample within the plane of the upper surface of the bed plate.

2. In a sample holder for miscroscopes, a bed plate, the central portion of which is cut away to define a relatively wide slot, a rest plate having a generally flat upper surface said rest plate being positioned within said slot, said rest plate being so proportioned that it is movable within said slot in a direction generally perpendicular to the base plane of said bed plate, a forked clip member pivotally supported upon said bed plate, said clip member comprising a pair of spaced parallel side portions, each side portion, when in contact with the bed plate, being positioned to overlie contiguous portions of the bed plate and rest plate, said bed plate and rest plate being provided with registering light transmitting openings positioned between said side portions, means biasing said rest plate in the direction of the side portions of said clip member, and spring means for biasing the side portions of said clip member into engagement with said bed plate.

JOHN H. GRAFF.